United States Patent [19]

Blake

[11] Patent Number: 4,941,550
[45] Date of Patent: Jul. 17, 1990

[54] BEARING LUBRICATING DEVICE

[76] Inventor: Kenneth D. Blake, Rt. 2 Box 723B, Winnfield, La. 74183

[21] Appl. No.: 342,549

[22] Filed: Apr. 24, 1989

[51] Int. Cl.$^5$ .................. F16C 1/24; F16N 11/04
[52] U.S. Cl. ........................... 184/5.1; 184/45.1
[58] Field of Search .............. 184/5.1, 45.1, 45.2, 184/105.1, 105.2

[56] References Cited

U.S. PATENT DOCUMENTS

| | | | |
|---|---|---|---|
| 2,599,472 | 6/1952 | Miller | 184/88.2 |
| 3,955,852 | 5/1976 | De Puydt | 184/45.1 |
| 4,058,185 | 11/1977 | Ploeger | 184/45.1 |
| 4,113,059 | 9/1978 | Markovski | 184/5.1 |
| 4,113,061 | 9/1978 | Peaster | 184/5.1 |
| 4,375,246 | 3/1983 | Tietje | 184/45.1 |

*Primary Examiner*—Douglas Hart
*Attorney, Agent, or Firm*—John M. Harrison

[57] ABSTRACT

A bearing lubricating device which is designed for attachment to the wheel bearing housing of a trailer or other vehicle to automatically lubricate the bearings in the bearing housing. The bearing lubricating device includes a cylindrical grease housing fitted with a spring-loaded piston and a piston plate extending from the piston, wherein the piston projects from the end of the grease housing. When grease is charged into the interior of the grease housing, the spring is compressed and forces the piston farther outwardly of the grease housing, to indicate that sufficient grease is provided in the grease housing for proper lubrication of the wheel bearings. In a first preferred embodiment of the invention a stop ring is provided in the housing to limit travel of the piston plate and piston in the housing and the projecting end of the piston is color-coded to indicate the grease content inside the grease housing. In a second preferred embodiment a retainer is attached to the piston for the same purpose.

49 Claims, 1 Drawing Sheet

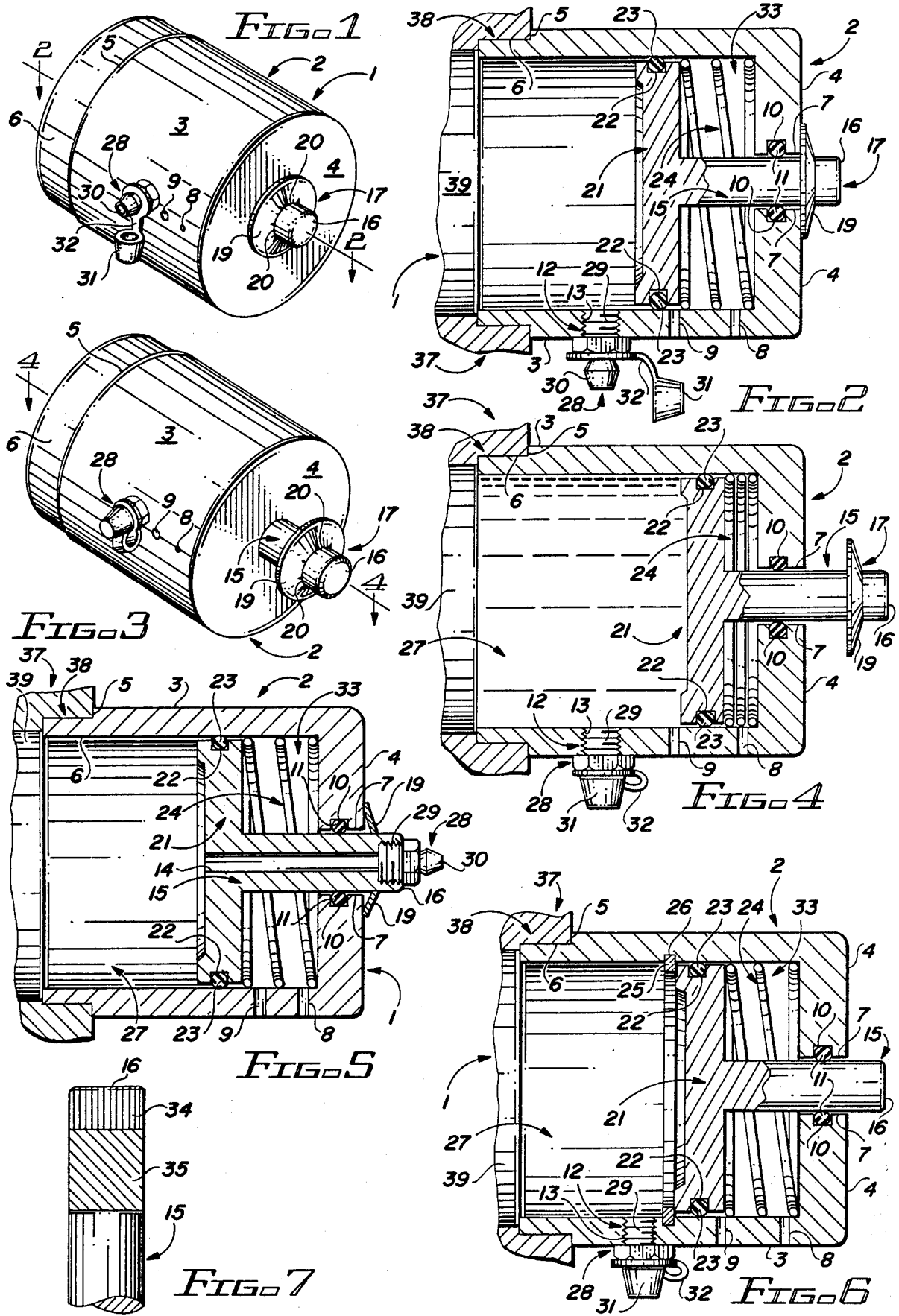

BEARING LUBRICATING DEVICE

BACKGROUND OF THE INVENTION

1. Field of the Invention

This invention relates to the lubrication of wheel bearings in trailers and other vehicles and more particularly, to a bearing lubricating device which is designed to self-lubricate trailer wheel bearings by operation of a springloaded piston located in a cylindrical housing containing a supply of lubricant, such as grease. The bearing lubricating device is characterized by a cylindrically-shaped grease housing, one end of which is open and adapted to fit in the wheel bearing housing of the wheel of a trailer or other vehicle, the open end communicating with a grease chamber located adjacent to the outside wheel bearing. A spring-loaded piston and piston plate combination is located in the grease housing, with the piston plate contacting the supply of grease, in order to bias the grease into contact with the wheel bearings and continually lubricate the wheel bearings as the trailer or other vehicle is operated and the wheels rotate. The free end of the piston projects through an opening in the end of the grease housing and in a first preferred embodiment of the invention, a stop ring is mounted in the housing to arrest the travel of the piston plate and piston and the projecting end of the piston is color-coded to indicate when the supply of grease in the grease housing is sufficient to properly lubricate both the inside and outside wheel bearings. In a second preferred embodiment a piston retainer is fitted over the projecting end of the piston and serves both to limit the travel of the piston inwardly of the bearing lubricating device and to indicate when the supply of grease in the grease housing has reached a sufficiently low level to require recharging of the grease housing. In another preferred embodiment of the invention, a grease fitting is seated in the side of the cylindrical grease housing, for charging the grease housing with grease and in a still further preferred embodiment of the invention, the grease fitting is located in the projecting end of the piston and grease is charged into the grease housing through a longitudinal grease supply passage or bore provided in the piston and communicating with the grease housing.

One of the problems which has long existed in the towing of various types of trailers and similar vehicles is that of failure of the wheel bearings in these trailers and vehicles. Trailers such as boat trailers, utility trailers, cattle trailers and the like, all utilize wheel bearings which must be periodically packed with grease and ultimately replaced, sometimes frequently under circumstances where these trailers are towed long distances. Furthermore, boat trailers are periodically submerged when boats ar launched in lakes and other waterways. Accordingly, the water washes the grease from within the wheel bearing housings, thereby causing the wheel bearings to be improperly lubricated and sometimes ruined, due to the development of friction and excessive heat while the trailer is towed. This circumstance necessitates a lengthy and sometimes expensive repair operation to replace one o both of the inside and outside wheel bearings in each wheel. The bearings must therefore be frequently lubricated, a time-consuming task which requires that the trailer be jacked to free the wheel, the bearing hub and wheel removed and the inside and outside bearings then removed from the bearing housing in the wheel, washed free of old grease, repacked with new grease and replaced in the bearing housing.

2. Description of the Prior Art

Various devices for lubricating wheel bearings and other bearings, as well as warning an operator as to the insufficiency of lubrication of these bearings, are known in the art. L. H. Des Isles U.S. Pat. No. 859,925, dated July 16, 1907, details an "Alarm Signal for Movable Bearings". The device detailed in this patent provides a bell or alarm sounder conveniently mounted directly upon the crank pin, crosshead and like shifting bearings in a machine and so arranged that the bell or alarm sounder will be actuated by the movement of the bearings when the latter become overheated. An "Oiling Device" is detailed in M. E. Brigham U.S. Pat. No. 915,731, dated Mar. 23, 1909, The device includes an oil chamber having multiple outlets from which oil is supplied to different parts of a machine to be lubricated, along with means for supplying the chamber with oil under pressure and control devices for regulating the automatic flow of oil through the outlets in a selected time period. J. T. Leonard U.S. Pat. No. 2,526,568, dated Oct. 17, 1950, details a "Lubricating Apparatus", which includes a measuring valve that is durable and reliable in operation and may be economically manufactured and adapted for use in a machine, either with grease or with oil as the lubricant. U.S. Pat. No. 2,694,997, dated Nov. 23, 1954, describes a signal device for indicating overheated bearings. The signal device is particularly useful as an indication that the journal bearing of a railroad car has become overheated and is adapted for permanent attachment on the journal axle of the railroad car to accomplish this objective. A "Method and Apparatus for Observing, Indicating and Maintaining Fluid Level" is detailed in Michael R Swearingen U.S. Pat. No. 3,983,958, dated Oct. 5, 1976,. The apparatus is designed for attachment to a bearing housing through an access conduit which provides for observation of the lubricating oil in the bearing housing, thereby ascertaining the level of the oil in the lubricating housing and maintaining a desired fluid level in the bearing. A "Lubricating Device" is detailed in T. G. Kincaid U.S. Pat. No. 960,341, dated June 7, 1910. The Kincaid device is characterized by a grease reservoir adapted to contain a stick of semi-solid lubricant. The reservoir includes a conical bottom which forms an auxiliary grease chamber and panels are provided in the bottom of the reservoir from the lower outer edge of the bottom into the auxiliary chamber at the apex of the cone. A cap is adjustably secured to the reservoir and includes an opening at the top and a spring-press plunger is disposed within the reservoir, with a graduated stem projecting through the opening of the cap and adapted to indicate the quantity of grease contained in the reservoir.

Various types of self-lubricating devices, one of which is marketed under the trademark "Bearing Buddy", are currently used to lubricate the wheel bearings in trailers and similar vehicles. These devices are patterned after the T. G. Kincaid lubricating device and each includes a grease chamber disposed within a cylindrical housing, a spring-loaded plate slidably mounted in the housing and a grease fitting provided in the housing for charging the housing with grease and forcing the spring-loaded plate outwardly. The spring-loaded plate continually exerts pressure against the grease and causes the grease to enter the wheel bearing housing and coat the wheel bearings.

Problems which are characteristic of these self-lubricating devices is the combination of complexity, the lack of facility for quickly determining when the grease housing needs recharging and the difficulty in recharging the grease housing quickly and efficiently, without overcharging. Accordingly, it is an object of this invention to provide a new and improved bearing lubricating device which is capable of self-lubricating the wheel bearings of a trailer or other vehicle by mounting in the vehicle bearing housing, automatically forcing grease from the interior of the bearing lubricating device into the bearing housing to coat the bearings therein and externally indicating when the grease supply in the bearing lubricating device is low.

Another object of the invention is to provide a bearing lubricating device which is capable of being removably mounted in the wheel bearing of trailer or similar vehicle for self-lubricating the wheel bearings therein and indicating the relative quantity of grease located in the device, which bearing lubricating device is characterized by a piston having a color-coded end projecting through the end of the grease-containing housing to indicate the quantity of grease provided in the housing.

A still further object of the invention is to provide a bearing lubricating device for lubricating the wheel bearings in trailers and other vehicles, which device includes a cylindrical, lubricant-containing housing provided with a spring-loaded piston which projects through an opening in the housing, which housing receives a retainer to prevent the piston from recessing in the housing, and further including a grease fitting located in the housing for periodically recharging the housing with lubricant.

Still another object of the invention is to provide a bearing lubricating device which is designed to self-lubricate the wheel bearings of a boat trailer or other vehicle, which bearing lubricating device is characterized by a cylindrical, grease-containing housing provided with spaced air and grease weep holes, respectively, a spring-loaded piston plate and piston slidably disposed in the housing and a grease fitting located in the end of the piston which projects through the end of the grease-containing housing, for periodically charging grease into the housing.

Yet another object of the invention is to provide a new and improved bearing lubricating device for lubricating the inside and outside wheel bearings of a trailer or other vehicle, which device includes a cylindrical housing, one end of which is open and adapted for removable insertion in the bearing housing of the trailer and further including a pair of spaced weep and air expulsion holes, respectively, and a closed end located opposite the open end. A piston extends through an opening provided in the closed end of the grease housing and a round, spring-loaded piston plate is provided on the opposite end of the piston for traversing a segment of the inside chamber of the housing and forcing grease into the bearing housing.

SUMMARY OF THE INVENTION

These and other objects of the invention are provided in a new and improved bearing lubricating device which includes a cylindrical, grease-containing housing having a closed end and the opposite end open and adapted for removable insertion in the bearing housing of a trailer or other vehicle, a spring-loaded piston and piston plate slidably disposed in the housing, for biasing the grease into the bearing housing and i contact with the inside and outside trailer bearings wherein the piston extends through the front of the grease housing for indicating the quantity of grease in the grease housing. In a preferred embodiment of the invention a stop ring is seated in the housing for limiting the travel of the piston plate and piston and the extending end of the piston is color-coded to indicate the quantity of grease in the grease chamber and in another preferred embodiment, a retainer is provided on the extending end of the piston to prevent the piston from recessing in the grease housing as the grease is depleted. The bearing lubricating device is provided with a grease fitting which is optionally located in the housing or in the end of the piston, for periodically introducing grease into the grease housing.

BRIEF DESCRIPTION OF THE DRAWING

The invention will be better understood by reference to the accompanying drawing, wherein:

FIG. 1 is a perspective view of a first preferred embodiment of the bearing lubricating device of this invention, with the piston in recessed configuration, indicating that grease in the grease chamber is dangerously depleted;

FIG. 2 is a sectional view taken along line 2—2 of the bearing lubricating device illustrated in FIG. 1;

FIG. 3 is a perspective view of the bearing lubricating device illustrated in FIG. 1, with the piston in extended configuration, indicating that grease in the grease chamber is at full capacity;

FIG. 4 is a sectional view taken along line 4—4 of the bearing lubricating device illustrated in FIG. 3;

FIG. 5 is a sectional view of a second preferred embodiment of the bearing lubrication of this invention, wherein the grease fitting is located in the extending end of the piston;

FIG. 6 is sectional view of yet another preferred embodiment of the bearing lubricating device, wherein a piston stop ring is provided in the grease housing, in order to limit the inward travel of the piston; and FIG. 7 is a side view of the piston illustrated in FIG. 6, with a preferred color-coding provided thereon to indicate when the grease chamber needs to be recharged with grease

DESCRIPTION OF THE PREFERRED EMBODIMENTS

Referring initially to FIGS. 1–4 of the drawing, in a first preferred embodiment the bearing lubricating device of this invention is generally indicated by reference numeral 1. The bearing lubricating device 1 includes a grease housing 2 having a cylindrical housing side 3, which is closed at one end by a housing end 4 and is open at the opposite end. A shoulder 5 is provided in the opposite end of the grease housing 2 and the opposite end is terminated by hub-engaging segment 6, which is designed to seat in the bearing housing opening 38 of a bearing housing 37 in a trailer (not illustrated), as illustrated in FIGS. 2 and 4. A portion of an outside wheel bearing 39 is illustrated in functional configuration in the bearing housing 37 and an inside wheel bearing (not illustrated) is mounted in the bearing housing 37 in spaced relationship with respect to the outside wheel bearing 39. As further illustrated in FIGS. 2 and 4, a piston access opening 7 is provided in the flat housing end 4 of the grease housing 2 and an air escape duct 8 is drilled or otherwise provided in the housing side 3, immediately adjacent to the housing end 4. A grease weep duct 9 is similarly drilled or otherwise provided in the housing side 3 in spaced relationship with respect to the air escape duct 8 and the air escape duct 8 communicates with a spring chamber 33, located in the forward end of the grease housing 2, while the grease weep duct 9 communicates with the grease chamber 27, located in the rear end of the grease housing 2, when the grease chamber 27 is charged with grease, as illustrated in FIG. 4. A piston O-ring groove 10 is provided inside the housing end 4 in communication with the piston access opening 7 and a piston O-ring 11 is seated in the piston O-ring groove 10 for purposes which will be hereinafter further described. A grease fitting seat 12 is also provided in the housing side 3 of the grease housing 2 and includes seat threads 13, for receiving the grease fitting threads 29 of a grease fitting 28, having a grease fitting nozzle 30 for receiving the charging end of a grease gun (not illustrated) and charging grease into the grease chamber 27, as hereinafter described. In a preferred embodiment of the invention a nozzle cap retainer 32 i designed to removably fit over the grease fitting nozzle 30 and is retained on the grease fitting 28 by means of a nozzle cap retainer 32, in order to prevent dust or other foreign material from plugging the opening in the grease fitting nozzle 30 when the grease fitting 28 is not in use.

As further illustrated in FIGS. 1-4, a piston 15 is slidably disposed and sealed by means of the piston O-ring 11 in the piston access opening 7, with the piston end 16 of the piston 15 extending from the housing end 4 and the opposite end joining or formed integrally with piston plate 21. The piston plate 21 is round and includes a plate O-ring groove 22 at the periphery thereof, which receives a plate O-ring 23 for sealing the space between the periphery of the piston plate 21 and the inner wall of the grease housing 2. A piston plate spring 24 is disposed in the spring chamber 33 between the piston plate 21 and the housing end 4, as illustrated in FIG. 2. In a preferred embodiment of the invention a piston retainer 17 is tightly seated on the piston 15 and includes a flared cap flange 19. As illustrated in FIGS. 1 and 3, flange tabs 20 are provided in the cap flange 19, in order to tightly secure the cap flange 19 of the piston cap 17 on the piston 15, spaced from the piston end 16.

Referring now to FIG. 5 of the drawing, in another preferred embodiment of the invention, the bearing lubricating device 1 is characterized by a grease fitting 28 which is threadably mounted in the piston end 16 of the piston 15 by means of the grease fitting threads 29. A grease supply passage 14 is drilled or otherwise longitudinally provided in the piston 15 and communicates with a grease supply opening (not illustrated) provided in the grease fitting 28, in order to introduce a supply of grease through the grease fitting nozzle 30 of the grease fitting 28, into the piston bore 14 and finally into the grease chamber 27. In the bearing lubricating device illustrated in FIG. 5, the displacement of the piston plate spring 24 is chosen such that when the piston plate spring 24 is open in non-biasing configuration in the spring chamber 33 as illustrated, the piston plate spring 24 exerts no rearward pressure against the piston plate 21 and the grease located in the grease chamber 27. Furthermore, the retainer flange 19 of the piston retainer 17 contacts the housing end 4 and prevents the piston plate 21 from moving further toward the wheel bearing 39 and the piston 15 and grease fitting 28 from depressing inside the piston bore 7 of the grease housing 2.

Referring now to FIGS. 6 and 7 of the drawings, under circumstances where it is desired to insure that the extending piston end 16 of the piston 15 does not recess inside the grease housing 2 under circumstances where no piston retainer 17 is inserted on the piston 15, a piston stop ring 25 is seated in a stop ring groove 26 located in the interior wall of the grease housing 2. The piston stop ring 25 serve to block the path of the piston plate 21 against the bias of the piston plate spring 24, located in the spring chamber 33, regardless of the depletion of grease in the grease chamber 27. Accordingly, in this embodiment of the invention there is no necessity for mounting a piston retainer 17 on the piston 15, since this extending end is always exposed regardless of the quantity of grease located in the grease chamber 27. As illustrated in FIG. 7, the extending end of the piston 15 can be provided with a red-color area 34, located adjacent to the piston end 16 and a green-color area 35 located immediately adjacent to the red-color area 34, in order to facilitate determining at a glance the quantity of grease in the grease chamber 27, as hereinafter further described.

Referring again to FIGS. 1-4 of the drawing, when the grease chamber 27 in the grease housing 2 of the bearing lubricating device 1 is empty, or if there is insufficient grease therein to compress the piston plate spring 24, the piston plate spring 24 is extended inwardly of the grease housing 2 in non-biased configuration, as illustrated in FIG. 2. Introduction of grease into the grease chamber 27 through the grease fitting 28 by means of a grease gun (not illustrated), exerts pressure against the piston plate 21 and compresses the piston plate spring 24, as air is forced from the spring chamber 33 through the air escape duct 8. When the piston plate spring 24 is fully compressed as illustrated in FIG. 4, grease is caused to escape from the grease chamber 27 of the grease housing 2 through the grease weep duct 9, thereby notifying the operator that the grease chamber 27 is full. The grease gun is then removed from attachment to the grease fitting nozzle 30 and the nozzle cap 31 is snapped over the grease fitting nozzle 30, as illustrated in FIG. 4. Pressure is now constantly applied to the piston plate 21 and the grease located in the grease chamber 27 by the bias in the piston plate spring 24, to force grease into the bearing housing opening 38 of the bearing housing 37 and coat the outside wheel bearing 39 as well as the corresponding inside wheel bearing (not illustrated). When the bearing lubricating device 1 is in the loaded configuration illustrated in FIGS. 3 and 4 the piston end 16 of the piston 15 is extended from the housing end 4 along with the piston retainer 17, which provides a visual indication of the quantity of grease located in the grease chamber 27. As the grease in the grease chamber 27 is alternately heated and cooled due to repeated wheel rotation, it is forced farther into the bearing housing 37 and both the piston 15 and the piston plate 21 slowly approach the wheel bearing 39 responsive to the bias of the piston plate spring 24. This process continues until the piston retainer 17 contacts the housing end 4 of the grease housing 2, as illustrated in FIGS. 1 and 2 of the drawing. Under these circumstances, additional grease must be charged into the grease chamber 27, in order to prevent excessive wear and ultimate failure of the outside wheel bearing 39, as well as the companion inside wheel bearing (not illustrated).

Referring again to the drawing, whether or not a piston retainer 17 is used on the piston 15 to control recessing of the piston 15 in the housing end 4, the extending end of the piston 15 may be color-coded with the red-color area 34 and the green-color area 35 as illustrated in FIG. 7, to visually indicate the quantity of grease provided in the grease chamber 27. For example, as illustrated in FIG. 6, under circumstances where the piston plate 21 is depressed toward the wheel bearing 39 to a maximum extent and lies against the piston stop ring 25, the piston 15 is retracted inside the housing end 4 such that only the red-color area 34 is visible to an observer. This indicates that the grease chamber 27 is depleted and additional grease should be charged into the grease chamber 27, in order to extend the piston 15 further outwardly of the housing end 4 such that the green-color area 35 is visible. As heretofore described, charging of the grease chamber 27 is effected by attaching a grease gun (not illustrated) to the grease fitting nozzle 30 of a grease fitting 28, which is either mounted in the housing side 3 of the grease housing 2 as illustrated in FIG. 6, or in the piston end 16 of the piston 15, as illustrated in FIG. 5.

It will be appreciated by those skilled in the art that the bearing lubricating device of this invention facilitates a quick, efficient and protective technique for providing grease to the wheel bearings of trailers and other vehicles. In each of the several embodiments of the bearing lubricating device, the observer can tell at a glance whether or not the wheel bearings are receiving a proper amount of grease and can take the required steps. In a most preferred embodiment of the invention the grease housing 2 is constructed of anodized aluminum to prevent corrosion and distortion from repeated fillings with grease, as well as to minimize damage from rocks and other objects struck by the towing vehicle and trailer wheels. Moreover, any lubricant such as grease, having a viscosity and composition suitable for lubricating wheel bearings can be used in the bearing lubricating device, according to the knowledge of those skilled in the art.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A bearing lubricating device for lubricating wheel bearings, comprising a generally cylindrically-shaped housing adapted to contain a lubricant, said housing having a closed end and an open end provided in communication with the wheel bearings; piston means slidably disposed in said housing, with one end of said piston means slidably projecting from said closed end of said housing; bias means provided in said housing, said bias means engaging said piston means for biasing said piston means inwardly of said housing and forcing the lubricant into contact with the wheel bearings; and a lubricant fitting seated in said housing for selectively introducing fresh lubricant into said housing.

2. The bearing lubricating device of claim 1 further comprising an air escape duct provided in said housing for allowing air to escape from said housing when the lubricant is introduced into said housing through said lubricant fitting.

3. The bearing lubricating device of claim 1 further comprising a lubricant weep duct provided in said housing for indicating when said housing is substantially filled with the lubricant.

4. The bearing lubricating device of claim 1 further comprising:
    (a) an air escape duct provided in said housing for allowing air to escape from said housing when the lubricant is introduced into said housing through said lubricant fitting; and
    (b) a lubricant weep duct provided in said housing for indicating when said housing is substantially filled with the lubricant.

5. The bearing lubricant device of claim 1 further comprising a lubricant supply passage provided in said piston means and wherein said lubricant fitting is relocated in said piston means in communication with said lubricant supply passage.

6. The bearing lubricating device of claim 1 further comprising:
    (a) an air escape duct provided in said housing for allowing air to escape from said housing when the lubricant is introduced into said housing through said lubricant fitting;
    (b) a lubricant weep duct provided in said housing for indicating when said housing is substantially filled with the lubricant; and
    (c) a lubricant supply passage provided in said piston means and wherein said lubricant fitting is relocated in said piston means in communication with said grease supply passage.

7. The bearing lubricating device of claim 1 wherein said piston means further comprises a round piston plate slidably disposed in said housing between said closed end and said open end of said housing, and an elongated piston extending from said piston plate and having a piston end slidably extending through said closed end of said housing, and further comprising:
    (a) piston seal means provided in said closed end of said housing for sealing said piston in slidable relationship in said closed end of said housing; and
    (b) piston plate seal means provided in the periphery of said piston plate for sealing said piston plate in slidable relationship in said housing.

8. The bearing lubricating device of claim 7 further comprising an air escape duct provided in said housing for allowing air to escape from said housing when the lubricant is introduced into said housing through said lubricant fitting.

9. The bearing lubricating device of claim 8 further comprising a lubricant weep duct provided in said housing for indicating when said housing is substantially filled with the lubricant.

10. The bearing lubricating device of claim 9 further comprising a lubricant supply passage longitudinally provided in said piston and said piston plate, said lubricant supply passage communicating with the lubricant in said housing, and wherein said lubricant fitting is relocated in said piston in communication with said lubricant supply passage.

11. The bearing lubricating device of claim 7 wherein said bias means further comprises a coil spring disposed in said housing between said piston plate and said closed end of said housing.

12. The bearing lubricating device of claim 11 further comprising:
    (a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

13. The bearing lubricating device of claim 7 further comprising first and second color indicia provided on said piston end of said piston, for approximately indicating the quantity of lubricant in said housing responsive to slidable movement of said piston and said piston plate in said housing.

14. The bearing lubricating device of claim 13 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

15. The bearing lubricating device of claim 14 further comprising a lubricant supply passage longitudinally provided in said piston and said piston plate, said lubricant supply passage communicating with the lubricant in said housing and wherein said lubricant fitting is relocated in said piston in communication with said lubricant supply passage.

16. The bearing lubricating device of claim 15 wherein said bias means further comprises a coil spring disposed in said housing between said piston plate and said closed end of said housing.

17. The bearing lubricating device of claim 7 further comprising a stop ring groove provided in the inside wall of said housing in spaced relationship with respect to said closed end of said housing and a stop ring seated in said stop ring groove, for arresting the travel of said piston plate inwardly of said housing, responsive to the bias in said bias means.

18. The bearing lubricating device of claim 17 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

19. The bearing lubricating device of claim 17 further comprising first and second color indicia provided on said piston end of said piston, for approximately indicating the quantity of lubricant in said housing, responsive to slidable movement of said piston and said piston plate in said housing.

20. The bearing lubricating device of claim 17 further comprising:
(a) an air escape duct provided in said housing for allowing air to escape from said housing when the lubricant is introduced into said housing through said lubricant fitting;
(b) a lubricant weep duct provided in said housing for indicating when said housing is substantially filled with the lubricant; and
(c) first and second color indicia provided on said piston end of said piston, for approximately indicating the quantity of lubricant in said housing, responsive to slidable movement of said piston and said piston plate in said housing.

21. The bearing lubricating device of claim 17 further comprising a lubricant supply passage longitudinally provided in said piston and said piston plate, said lubricant supply passage communicating with the lubricant in said housing, and wherein said lubricant fitting is relocated in said piston in communication with said lubricant supply passage.

22. The bearing lubricating device of claim 17 wherein said bias means further comprises a coil spring disposed in said housing between said piston plate and said closed end of said housing and further comprising:
(a) an air escape duct provided in said housing for allowing air to escape from said housing when the lubricant is introduced into said housing through said lubricant fitting;
(b) a lubricant weep duct provided in said housing for indicating when said housing is substantially filled with the lubricant;
(c) first and second color indicia provided on said piston end of said piston, for approximately indicating the quantity of lubricant in said housing; and
(d) a lubricant supply passage longitudinally provided in said piston and said piston plate, said lubricant supply passage communicating with the lubricant in said housing, and wherein said lubricant fitting is relocated in said piston in communication with said lubricant supply passage.

23. The bearing lubricating device of claim 7 further comprising retainer means disposed on said piston end, whereby said piston end is prevented from recessing in said opposite end of said housing responsive to the bias of said bias mean when the quantity of lubricant is reduced in said housing.

24. The bearing lubricating device of claim 23 further comprising an air escape duct provided in said housing for allowing air to escape from said housing when the lubricant is introduced into said housing through said lubricant fitting.

25. The bearing lubricating device of claim 23 further comprising a lubricant weep duct provided in said housing for indicating when said housing is substantially filled with the lubricant.

26. The bearing lubricating device of claim 23 wherein said bias means further comprises a coil spring disposed in said housing between said piston plate and said opposite end of said housing.

27. The bearing lubricating device of claim 23 wherein said bias means further comprises a coil spring disposed in said housing between said piston plate and said opposite end of said housing and further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

28. The bearing lubricating device of claim 27 wherein said retainer means further comprises a flange and a plurality of flange tabs provided in said flange for engaging said piston, said flange adapted to engage said opposite end of said housing and arrest the travel of said piston plate inwardly of said housing responsive to the bias in said coil spring.

29. The bearing lubricating device of claim 28 further comprising first color indicia provided on said flange and said piston end of said piston and second color indicia provided on said piston adjacent to said first color indicia, for approximately indicating the quantity of lubricant in said housing, responsive to slidable movement of said piston and said piston plate in said housing.

30. A bearing lubricating device for mounting in a wheel housing and lubricating wheel bearings provided in the wheel housing, said bearing lubricating device comprising a generally cylindrically-shaped housing adapted to contain a lubricant and having a closed end and an open end spaced from said closed end, said open end provided in communication with the wheel bearings; a stop ring groove provided in the inside wall of said housing in spaced relationship with respect to said closed end of said housing and a stop ring seated in said stop ring groove; a round piston plate slidably disposed in said housing between said stop ring and said closed end of said housing and piston plate seal means provided in the periphery of said piston plate for sealing said piston plate in slidable relationship in said housing; a piston access opening provided in said closed end of said housing and piston seal means provided in said piston access opening; a piston extending from said piston plate through said piston access opening and said seal means, wherein said piston is sealed in slidable relationship in said piston access opening by said piston seal means; a coil spring located in said housing between said piston plate and said closed end of said housing for biasing said piston plate toward said open end of said housing; and a lubricant fitting seated in said housing for selectively introducing fresh lubricant into said housing, whereby said piston plate exerts pressure on lubricant provided in said housing between said piston plate and said open and and causes the lubricant to coat the wheel bearings, responsive to the bias of said coil spring.

31. The bearing lubricating device of claim 30 further comprising an air escape duct provided in said housing for allowing air to escape from said housing when the lubricant is introduced into said housing through said lubricant fitting.

32. The bearing lubricating device of claim 30 further comprising a lubricant weep duct provided in said housing for indicating when said housing is substantially filled with the lubricant.

33. The bearing lubricating device of claim 30 further comprising a lubricant supply passage provided in said piston and said piston plate, said lubricant supply passage communicating with the lubricant in said housing, and wherein said lubricant fitting is relocated in the extending end of said piston, said lubricant fitting provided in communication with said lubricant supply passage, for selectively introducing lubricant into said housing 34. The bearing lubricating device of claim 30 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

35. The bearing lubricating device of claim 34 further comprising a lubricant supply passage provided in said piston and said piston plate, said lubricant supply passage communicating with the lubricant in said housing, and wherein said lubricant fitting is relocated in the extending end of said piston, said lubricant fitting provided in communication with said lubricant supply passage for selectively introducing lubricant int said housing.

36. The bearing lubricating device of claim 30 further comprising first and second color indicia provided on the extending end of said piston, for approximately indicating the quantity of lubricant in said housing, responsive to slidable movement of said piston and said piston plate in said housing.

37. The bearing lubricating device of claim 30 further comprising:
(a) an air escape duct provided in said housing for allowing air to escape from said housing when the lubricant is introduced into said housing through said lubricant fitting;
(b) a lubricant weep duct provided in said housing for indicating when said housing is substantially filled with the lubricant; and
(c) first and second color indicia provided on the extending end of said piston, for approximately indicating the quantity of lubricant in said housing, responsive to slidable movement of said piston and said piston plate in said housing.

38. The bearing lubricating device of claim 37 further comprising a lubricant supply passage provided in said piston and said piston plate said lubricant supply passage communicating with the lubricant in said housing, and wherein said lubricant fitting is relocated in the extending end of said piston in communication with said lubricant supply passage.

39. A bearing lubricating device for mounting in a wheel housing and lubricating wheel bearings provided in the wheel housing, said bearing lubricating device comprising a generally cylindrically-shaped housing adapted to contain a lubricant and having a closed end and an open end spaced from said closed end, said open end provided in communication with the wheel bearings; a round piston plate slidably disposed in said housing between said open end and said closed end of said housing and piston plate seal means provided in the periphery of said piston plate for sealing said piston plate in slidable relationship in said housing; a piston access opening provided in said closed end of said housing and piston seal means provided in said piston access opening; a piston extending from said piston plate through said piston access opening and said seal means, wherein said piston is sealed in slidable relationship in said piston access opening by said piston seal means; retainer means disposed on the end of said piston extending through said piston access opening for retaining a portion of the extending end of said piston outside of said housing when the quantity of lubricant is reduced in said housing; a lubricant fitting seated in said housing for selectively introducing fresh lubricant into said housing; and a coil spring located in said housing between said piston plate and said closed end of said housing for biasing said piston plate toward said open end of said housing, whereby said piston plate exerts pressure on the lubricant provided in said housing and causes the lubricant to coat the wheel bearings, responsive to the bias of said coil spring.

40. The bearing lubricating device of claim 39 further comprising an air escape duct provided in said housing for allowing air to escape from said housing when the lubricant is introduced into said housing through said lubricant fitting.

41. The bearing lubricating device of claim 39 further comprising a lubricant weep duct provided in said housing for indicating when said housing is substantially filled with the lubricant.

42. The bearing lubricating device of claim 39 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

43. The bearing lubricating device of claim 39 further comprising a lubricant supply passage provided in said piston and said piston plate, said lubricant supply passage communicating with the lubricant in said housing, and wherein said lubricant fitting is relocated in said extending end of said piston, said lubricant fitting provided in communication with said lubricant supply passage, for selectively introducing lubricant into said housing.

44. The bearing lubricating device of claim 39 wherein said retainer means further comprises a flange and a plurality of flange tabs provided in said flange for engaging said piston, said flange adapted to engage said closed end of said housing and arrest the travel of said piston plate inwardly of said housing, responsive to the bias in said coil spring.

45. The bearing lubricating device of claim 44 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

46. The bearing lubricating device of claim 44 further comprising a lubricant supply passage provided in said piston and said piston plate, said lubricant supply passage communicating with the lubricant in said housing, and wherein said lubricant fitting is relocated in said extending end of said piston, said lubricant fitting provided in communication with said lubricant supply passage, for selectively introducing lubricant into said housing.

47. The bearing lubricating device of claim 39 further comprising first color indicia provided on said flange and said extending end of said piston and second color indicia provided on said extending end of said piston adjacent to said first color indicia, for approximately indicating the quantity of lubricant in said housing, responsive to slidable movement of said piston and said piston plate in said housing.

48. The bearing lubricating device of claim 44 further comprising:
(a) an air escape duct provided in said housing for allowing air to escape from said housing when the lubricant is introduced into said housing through said lubricant fitting; and
(b) a lubricant weep duct provided in said housing for indicating when said housing is substantially filled with the lubricant.

49. The bearing lubricating device of claim 48 further comprising a lubricant supply passage provided in said piston and said piston plate, said lubricant supply passage communicating with the lubricant in said housing, and wherein said lubricant fitting is relocated in said extending end of said piston, said lubricant fitting provided in communication with said lubricant supply passage, for selectively introducing lubricant into said housing.

* * * * *